United States Patent [19]

Quinquis et al.

[11] Patent Number: 4,933,932
[45] Date of Patent: Jun. 12, 1990

[54] BUFFER QUEUE WRITE POINTER CONTROL CIRCUIT NOTABLY FOR SELF-CHANNELLING PACKET TIME-DIVISION SWITCHING SYSTEM

[75] Inventors: Jean-Paul Quinquis, Perros-Guirec; Michel Servel, Lannion; Albert Lespagnol, Perros-Guirec, all of France

[73] Assignee: Etat Francais represente par le Ministre des Postes et Telecommunications et de l'Espace (Centre National d'Etudes des Telecommunications), Issy-les-Moulineaux, France

[21] Appl. No.: 286,754
[22] Filed: Dec. 21, 1988
[30] Foreign Application Priority Data Dec. 24, 1987 [FR] France .................. 87 18163

[51] Int. Cl.⁵ .................. H04J 3/02; H04J 3/26
[52] U.S. Cl. .................. 370/60; 370/94.1
[58] Field of Search .................. 370/94, 60, 58, 94.1

[56] References Cited
U.S. PATENT DOCUMENTS

4,603,416  7/1986  Servel et al. .................. 370/94
4,646,294  2/1987  Eliscu et al. .................. 370/60
4,799,219  1/1989  Calvignac et al. .................. 370/94

Primary Examiner—Douglas W. Olms
Assistant Examiner—Min Jung
Attorney, Agent, or Firm—Lowe, Price, LeBlanc, Becker & Shur

[57] ABSTRACT

The circuit embodying the invention comprises a pointer memory memorizing J=16 decremented write pointers associated with J=16 buffer queues. A channelling word supplied conjointly to incoming data and indicating the buffer queue in which this data is to be written, addresses the corresponding decremented write pointer. The write pointer and the channelling word form a write address for a buffer memory used as a medium for the J=16 queues. A comparator detects equality between the write pointer and the read pointer and in this case inhibits the acceptance of the incoming data which would overlay data not yet read. Logic means associated with the comparator control the updating, by possible incrementation, of the write pointer values contained in the pointer memory, after each data read in the buffer queues. This circuit is particularly well suited for use in an asynchronous self-channelling packet time-division switching system.

10 Claims, 7 Drawing Sheets

FIG. 5 pointer advance

BUFFER QUEUE WRITE POINTER CONTROL CIRCUIT NOTABLY FOR SELF-CHANNELLING PACKET TIME-DIVISION SWITCHING SYSTEM

BACKGROUND OF THE INVENTION

This invention relates in a general way to write and read control of data in a plurality of buffer queues. More particularly, the invention relates to write and read control of data in a plurality of buffer queues included in an asynchronous and possibly synchronous packet time-division switching system.

In such a switching system, buffer queues are respectively associated with outgoing time-division multiplexes. The incoming packets are memorized temporarily as they arrive in the queues associated with the outgoing multiplexes towards which the packets are to be transmitted. Write pointers respectively associated with the queues each indicate a first free cell in the corresponding queue. The queues are read cyclically under the control of a time base which successively selects the queues for reading and issues an incremented read pointer at the end of each queue read cycle.

The rate of incoming packets intended for a same queue is variable and the packets are written into the queue at almost random moments.

A buffer queue is dimensioned to absorb average fluctuations in the rate of incoming packets with regard to an average rate so that, as a rule, the filling level of the queues varies between a minimum level wherein the queue is empty and a maximum level wherein the queue is full but without reaching the maximum level. However, sporadic increases in the rate of incoming packets can be such that the filling level of the queue reaches the maximum level. All new writings of incoming packets in the full queue must then be inhibited while the queue is being emptied.

OBJECT OF THE INVENTION

The main object of this invention is to provide a circuit to control the write pointers of a plurality of buffer queues which is designed to be used in a switching system such as described above.

A second object of the invention is to provide a self-channelling packet time-division switching system for the implementation of the pointer control circuit embodying the invention.

SUMMARY OF THE INVENTION

Accordingly to the main object of the invention, the circuit for the control of write pointers of a plurality of J buffer queues, whereby J is a predetermined integer, memorizing data groups temporarily in chronological order of arrival, a channelling word selecting the buffer queue in one of the cells of which the incoming data group is to be written being supplied with each of the data groups entering the queues, the queues being read cyclically under the control of a time base issuing queue addresses to be read and a queue cell read pointer, the time base incrementing said read pointer by one unit at every queue read cycle so as to successively read the cells in each of the queues, wherein it comprises:

means for memorizing decremented values of J write pointers respectively associated with the J buffer queues, a write pointer identifying a cell of the respective queue liable to be free to memorize a further incoming data group to be written in said queue, means for reading the decremented value of the write pointer associated with a selected queue in the memorizing means according to the channelling word during writing of an incoming data group in the selected queue and according to the queue address during reading of an outgoing data group from the selected queue, first means for incrementing by one unit the decremented value read in the memorizing means so as to deduct the value of the write pointer of the selected queue, second means for incrementing by two units during the writing of an incoming data group, the decremented value read in the memorizing means so as to deduct the value incremented by one unit of the write pointer of the selected queue, means of comparing write and read pointers for detecting an equality between the value of the write pointer associated with the selected queue and the value of the read pointer, and means for writing in the memorizing means the deducted value of the write pointer of the selected queue, either consecutive to the writing of an incoming data group in the cell of the selected queue identified by the write pointer for which the means of comparing do not detect an equality between the deducted value of the write pointer of the selected queue and the value of the read pointer, or consecutive to the reading of an outgoing data group in the selected queue for which the means of comparing detect an equality between the deducted value of the write pointer of the selected queue and the value of the read pointer.

Accordingly to the second object of the invention, a self-channelling packet time-division switching system in which the packets issued by a plurality of incoming time-division multiplexes are to be switched towards a plurality of J outgoing time-division multiplexes, each pointer including a channelling word identifying the outgoing multiplex towards which the packet is to be switched, said system comprising:

input means respectively associated with the incoming multiplexes for detecting the packet in the incoming multiplexes and transmitting them in synchronism, and for producing a validation signal bit with each packet transmitted, said bit having a predetermined logic state for signalling an inhibited packet, means connected to the input means for multiplexing the packets transmitted by the input means, a buffer memory comprising a plurality of J buffer queues respectively associated with the J outgoing multiplexes for temporarily memorizing the packets, and means for demultiplexing the packets read cyclically in the buffer memory queues under the control of a time base issuing a queue address and a queue read pointer, and for transmitting the demultiplexed packets in the outgoing multiplexes, wherein it comprises a write pointer control circuit embodying the invention for receiving the packet channelling words, the validation signal bit, the queue address and the read pointer and controlling the J write pointer respectively of the J buffer queues in said buffer memory.

BRIEF DESCRIPTION OF THE DRAWING

The foregoing and other objects, features and advantages of the invention will be apparent from the following detailed description of several embodiments of the invention with reference to the corresponding accompanying drawings in which.

DESCRIPTION OF THE PREFERRED EMBODIMENTS

An asynchronous self-channelling fixed-length-packet time-division switching system, of the so-called "paragonal conversion" type for the implementation of the circuit embodying the invention is described as an example in the following paragraphs.

The switching system described is a transit switching exchange included in an asynchronous time-division network comprising e.g. three switching stages, first and last stages comprised of virtual circuit type switching exchange and an intermediary stage comprised of transit switching exchanges. The switching system ensures the switching of fixed length packets coming from $I=16$ incoming multiplexes E0 to E15 and to be transmitted towards $J=16$ outgoing multiplexes S0 to S15. The packets are of fixed length L equals $I=J=16$ octets. Each packet is comprised of a first octet B0 including a self-channelling word AA, a second octet B1 corresponding to a label ET, and $L-2=14$ information octets B2 to B15. The switching system switches a packet according to the value of its self-channelling word AA indicating the outgoing multiplex Sj, whereby j is any integer between 0 and $J-1=15$, towards which this packet is to be transmitted. The word AA takes one of the integer values between 0 and $J-1=15$ and is coded by $\log_2 J=4$ predetermined bits of the octet B0. The label ET of a packet passing through the switch is not modified by the latter; the label is switched and transmitted in the same way as an information octet. In fact, the label ET is more particularly intended for a virtual circuit switch on the last switching stage, located below the transit switch. The transit switch only uses the label ET to detect empty packets PV also called synchronization packets and not for the switching control. Any incoming multiplex Ei, whereby i is an integer between 0 and $I-1=15$, carries valid packets PQ, i.e. containing valid information to be transmitted, and the synchronization packets PV that are not to be transmitted towards the outgoing multiplexes S0 to S15. A synchronization packet PV comprises a label ET equal to e.g. "00001111" and 14 octets B2 to B15 equal to e.g. "01010101". A valid information packet PQ has a label ET different from "00001111".

Figure 1:
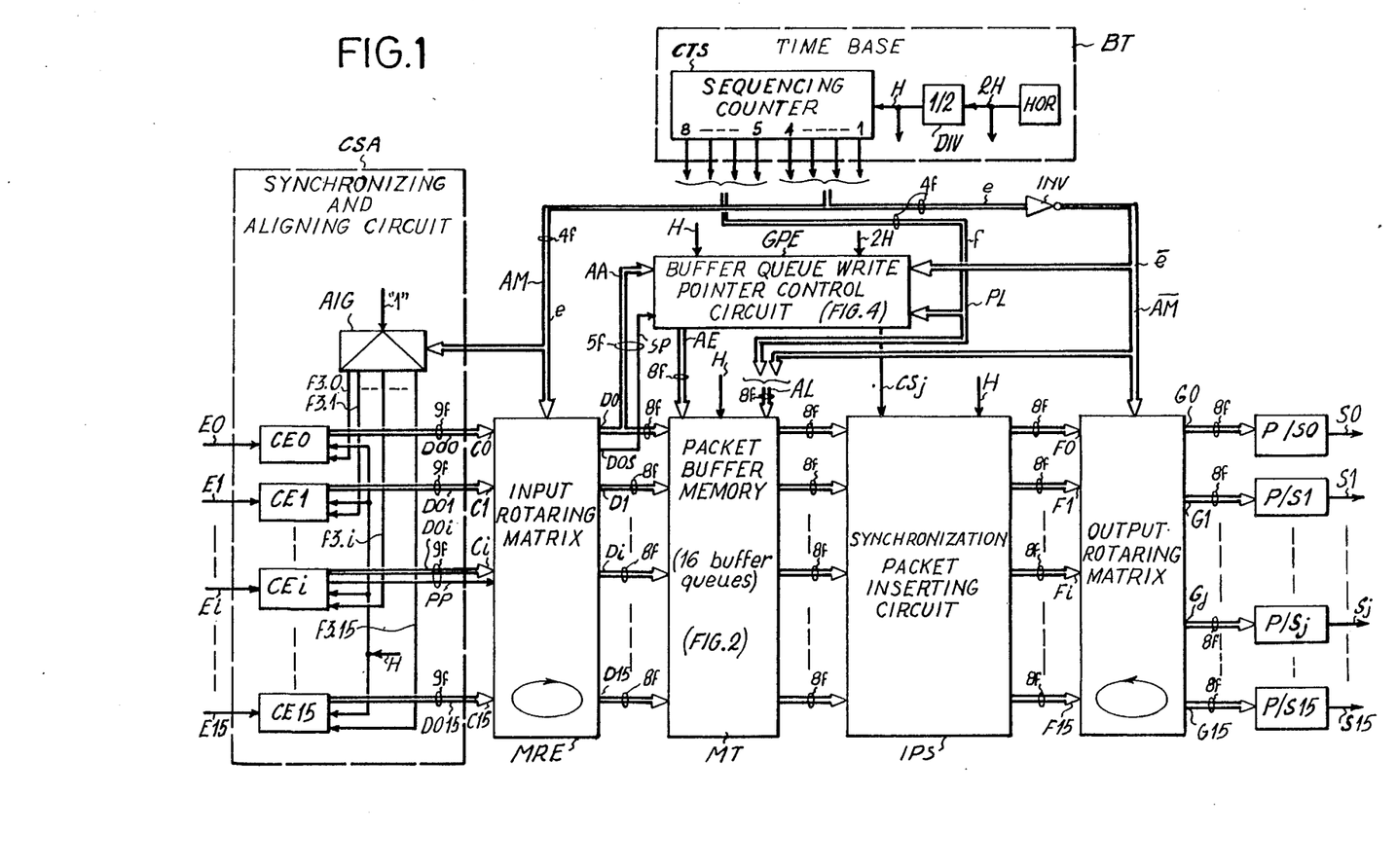
FIG. 1 is a block diagram of an asynchronous self-channelling packet switching system for the implementation of the circuit embodying the invention.

In reference to FIG. 1, the self-channelling packet switching system for the implementation of the buffer queue write pointer control circuit GPE embodying the invention comprises essentially, further the circuit GPE, a time base BT, a synchronizing and aligning circuit CSA, an input rotating matrix MRE, an output rotating matrix MRS, a packet buffer memory MT and a synchronization packet inserting circuit IPS.

The time base BT comprises an oscillator HOR producing a local clock signal 2H of predetermined period T/2, a divide-by-2 frequency divider by, DIV receiving the signal 2H and deriving a local clock signal H of period equal to T, and a sequencing counter CTS.

The sequencing counter CTS is a binary counter having stages in number equal to at least 8. Counter CTS receives the signal H at a clock input.

Four outputs 1 to 4 respectively of four stages of least significance in the counter CTS are connected to a four-wire first multiplex address bus e and cyclically issue $I=J=16$ multiplex selection addresses AM="0000" to AM="1111" respectively during the equal time intervals IT0 to IT15 of a duration frame equal to 16T. The addresses AM are supplied to the synchronizing and aligning circuit CSA and to the input rotating matrix MRE so as to control their sequencing. An inverter INV inverses the addresses AM and cyclically supplies through a second multiplex address bus $\bar{e}$, inverted multiplex selection addresses $\overline{AM}$="1111" to $\overline{AM}$="0000" to the output rotating matrix MRS as well as to the circuit GPE and the buffer memory MT.

Four outputs 5 to 8 respectively of four stages of most significance in the counter CTS are connected to a bus f carrying a word called read pointer PL which cyclically takes P=16 successive values "0000" to "1111". The multiplex selection addresses $\overline{AM}$ and the read pointer PL are supplied in parallel to the buffer memory MT and form packet read addresses AL to cyclically address for reading $J \cdot P=16^2=256$ memory cells where the packets are stored.

The essential function of the synchronizing and aligning circuit CSA is to align different packets PQ and PV transmitted in plesiochronism into the incoming multiplexes E0 to E15 and to transmit the packets in synchronism towards the input rotating matrix MRE at the rhythm of the local clock signal H. The synchronizing and aligning circuit CSA is comprised of 16 input circuits CE0 to CE15 and of a control switcher-demultiplexer AIG.

The multiplexes E0 to E15 are respectively connected to circuits CE0 to CE15 and supply bit by bit the packets PQ and PV carried in serial form.

In an input circuit CEi, the packets PQ issued by the multiplex Ei are stored in a buffer queue before being issued via a bus DOi, octet by octet and under the control of the clock signal H, to 8 inputs of a port with 9 parallel inputs Ci of the matrix MRE. A ninth input of the port Ci receives, in parallel with the octets, a signalling signal PP supplied by the circuit CEi. The signal PP is in a logic state "1" when the octets being transmitted are the octets of an information packet PQ, and in a logic state "0" when the octets being transmitted are octets of a synchronization packet PV.

The switcher-demultiplexer AIG has a data input wired to a logic state "1" and 16 outputs respectively connected by wires f3.0 to f3.15 to read control and synchronization inputs of the circuits CE0 to CE15. Selection inputs of the switcher AIG are connected to the bus e and receive the addresses AM.

The input circuits CE0 to CE15 are sequentially read controlled by the switcher AIG through the wires f3.0 to f3.15. An input circuit CEi issues to the port Ci of the matrix MRE a packet between two successive activations by the switcher AIG.

The beginning of the transmission of a first packet octet B0 to the port Ci is synchronous with an impulsion in the state "1" issued in the wire f3.i by the switcher AIG. The switcher-demultiplexer AIG of the circuit CSA sequentially controls the circuits CE0 to CE15 in such a way that if the first packet octet B0 is issued by the input circuit CEi at time $t_0$ during the time interval ITi, the circuit CE(i=1) issues the first octet B0 of another packet at time $t_0+T$. The transmission of the packets by the circuits CE0 to CE15, respectively to the ports C0 to C15 of the matrix MRE, is carried out in a temporally "oblique" way. This type of transmission is intended to avoid two or several self-channelling packet words being issued simultaneously by two or several input circuits CE to the ports C of the matrix MRE.

The matrices MRE and MRS are analogous. The matrix MRE realizes a paragonal conversion by carrying out under control of the time base BT, connected to the matrix MRE by the bus e, a cycle of 0 to 15 permutations on the octets and bits supplied to the matrix MRE respectively during the time intervals IT0 to IT15 assigned to the incoming multiplexes E0 to E15.

A packet having $L=16$ octets, B0 to B15, is supplied by output ports D0 to D15 of the matrix MRE in diagonal form in such a way that if the octet B0 is supplied by the port D0 at time $t_0$, the octets B1, B2, ... B15 are supplied by the ports D1, D2, ... D15 at times $t_0+T$, $t_0+2T$, ... $t_0+15T$, respectively.

The matrix MRS realizes on the packets, after the switching treatment in the memory MT, an inverse paragonal conversion so as to issue the outgoing packets of the matrix MRS according to a configuration analogous to that of the packets entering the matrix MRE. Permutation control inputs of the matrix MRS are connected to the bus $\bar{e}$ so as to control in the matrix MRS the cycle of 15 to 15 permutations in an inverse order to that carried out in the matrix MRE. 8-input ports F0 to F15 of the matrix MRS receive the packet octets coming from the packet memory MT and from the synchronization packet inserting circuit IPS. The packet octets are supplied by the matrix MRS via 8-output ports, G0 to G15, to parallel-to-serial converters, P/S0 to P/S15, which transmit the packets bit by bit in the outgoing multiplexes S0 to S15.

Following the permutations carried out in the matrix MRE, all the octets B0 are issued by the first output port D0 of the matrix MRE. The port D0 is comprised of 9 parallel outputs. A first output DOS of the port D0 issues in parallel with the packet octets B0, signalling bits SP serially corresponding to the logic states of the signalling signal PP respectively for the outgoing packets of the matrix MRE. For an outgoing information packet PQ, the corresponding bit SP is in the state "1"; for an outgoing synchronization packet PV, the corresponding bit SP is in the state "0". The octets B0 are issued by the 8 remaining outputs of the port D0. The ports D0 to D15 apply through respective 8-wire buses, the packet octets B0 to B15 to 16 eight-parallel data input ports of the packet memory MT. Moreover, the output DOS issuing the bits SP and four other outputs of the port D0 issuing the self-channelling words AA are connected by a 5-wire bus to the circuit GPE.

Figure 2:
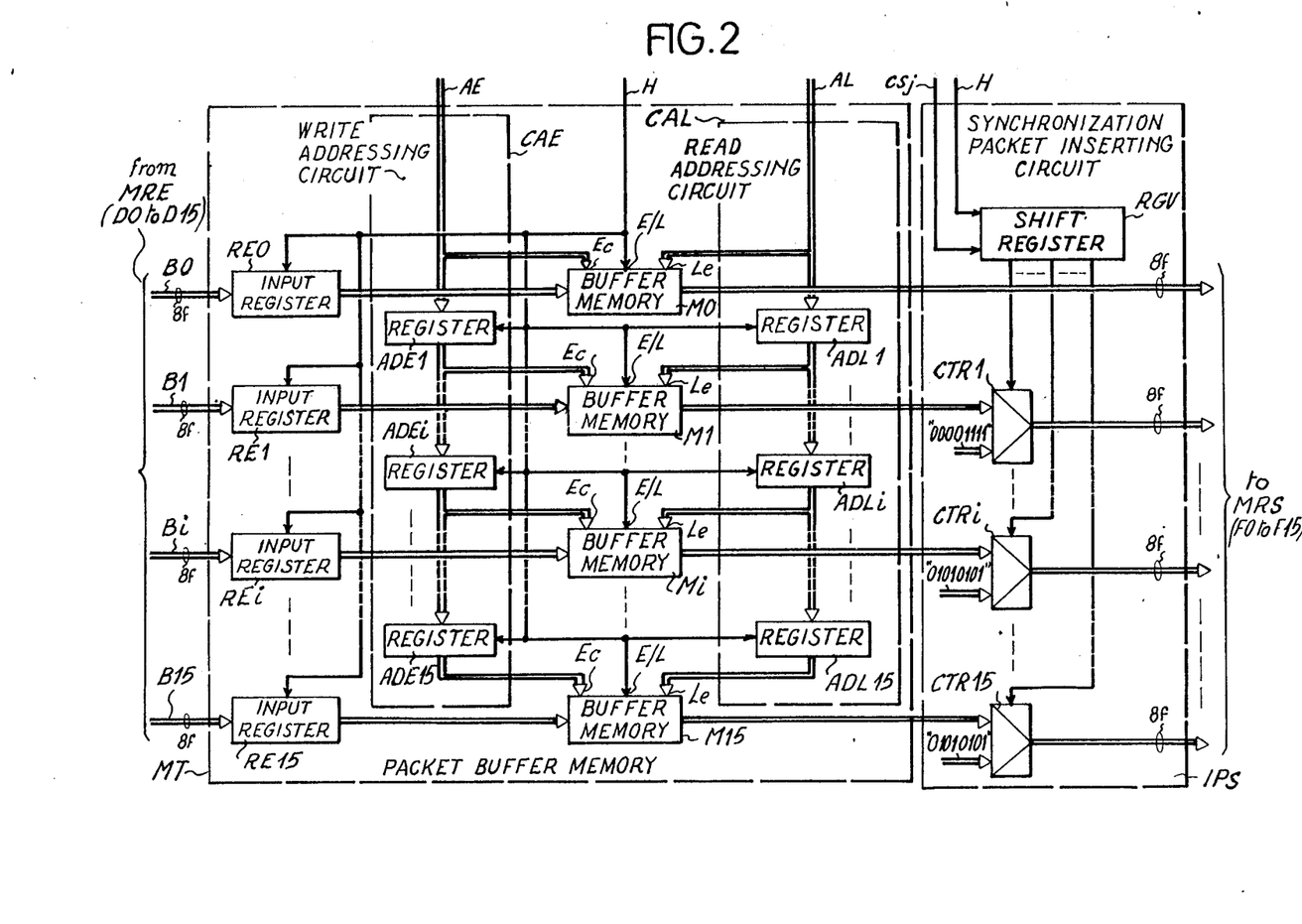
FIG. 2 shows the detailed structure of a packet buffer memory and of a synchronization packet inserting circuit included in the switching system shown in FIG. 1.

The packet buffer memory MT is shown in FIG. 2. The memory MT comprises $I=J=16$ octet buffer submemories M0 to M15, $I=J=16$ input registers RE0 to RE15, a write addressing circuit CAE, and a read addressing circuit CAL.

The submemories M0 to M15 respectively memorize the packet octets B0 to B15. The submemories M0 to M15 have each a capacity equal to $J \cdot P = 256$ octets. The packet octets B0 to B15 are supplied diagonally to data inputs of the submemories M0 to M15 through the input registers RE0 to RE15 respectively. The input registers RE0 to RE15 are read and write controlled by the clock signal H and their function is to introduce a delay time equal to the period T of the clock signal H. This delay time compensates a response time of the circuit GPE, between the moment at which a self-channelling word AA is received by the circuit GPE and the moment at which a packet write address AE indicating a free packet cell CP of the buffer memory MT in which the incoming packet is to be written, is issued in reply from the circuit GPE.

The function of the write addressing circuit CAE is to diagonally shift in time the application of each of the packet write addresses AE supplied by the circuit GPE, to write address inputs Ec of the submemories M0 to M15 in synchronism with the diagonal transfer of the octets of a packet to be written, from the input registers RE0 to RE15 towards data inputs of the submemories M0 to M15. The packets are thus memorized in the memory MT in parallel form, i.e. all the octets B0 to B15 of a packet are respectively memorized in the submemories M0 to M15 at a same address AE.

The circuit CAE comprises $J-1=15$ registers ADE1 to ADE15 respectively associated with the submemories M1 to M15. The reading and writing of the registers ADE1 to ADE15 are controlled by the clock signal H. The registers ADE1 to ADE15 are connected in cascade and form a "delay line". Each of the registers ADE1 to ADE15 introduces a delay time equal to a period T of the clock signal H on the write address AE supplied at input of the circuit CAE. Any write address AE supplied by the circuit GPE is applied directly to the write address inputs Ec of the submemory M0 and to data inputs of the register ADE1 so as to be supplied, via data outputs of registers ADE1, ... ADEi, ... ADE15, to the write address inputs Ec of the submemories M1, ... Mi, ... M15 respectively at times $t_0+T$, ... $t_0+iT$, ... $t_0+15T$, if it is considered that the address AE is applied to the inputs Ec of the submemory M0 at time $t_0$.

The read addressing circuit CAL is analogous to the write addressing circuit CAE. The function of circuit CAL is to read address the submemories M0 to M15 by means of the same packet address that is shifted in time, so that each read packet leave diagonally by the submemories M0 to M15. The circuit CAL comprises $J-1=15$ registers, ADL1 to ADL15, respectively associated with the submemories M1 to M15 and connected in cascade. All the registers ADL1 to ADL15 are write and read controlled by the clock signal H. Each of the registers ADL1 to ADL15 introduces a delay time equal to the period T. In this way, if a packet read address AL is applied to read address inputs Le of the submemory M0 at time $t_0$, this same address AL is applied to the inputs Le of the submemories M1, ... Mi, ... M15 respectively at times $t_0+T$, ... $t_0+iT$, ... $t_0+15T$, and consecutively the packet memorized in the memory cell having the address AL is issued diagonally.

The submemories M0 to M15 are alternatively controlled for writing and reading. To do so, the clock signal H is applied to the write/read control inputs E/L of the submemories M0 to M15 and controls packet writing during first half-periods when signal H is at the logic state "1" and packet reading during second half-periods when signal H is at the logic state "0".

Figure 3:
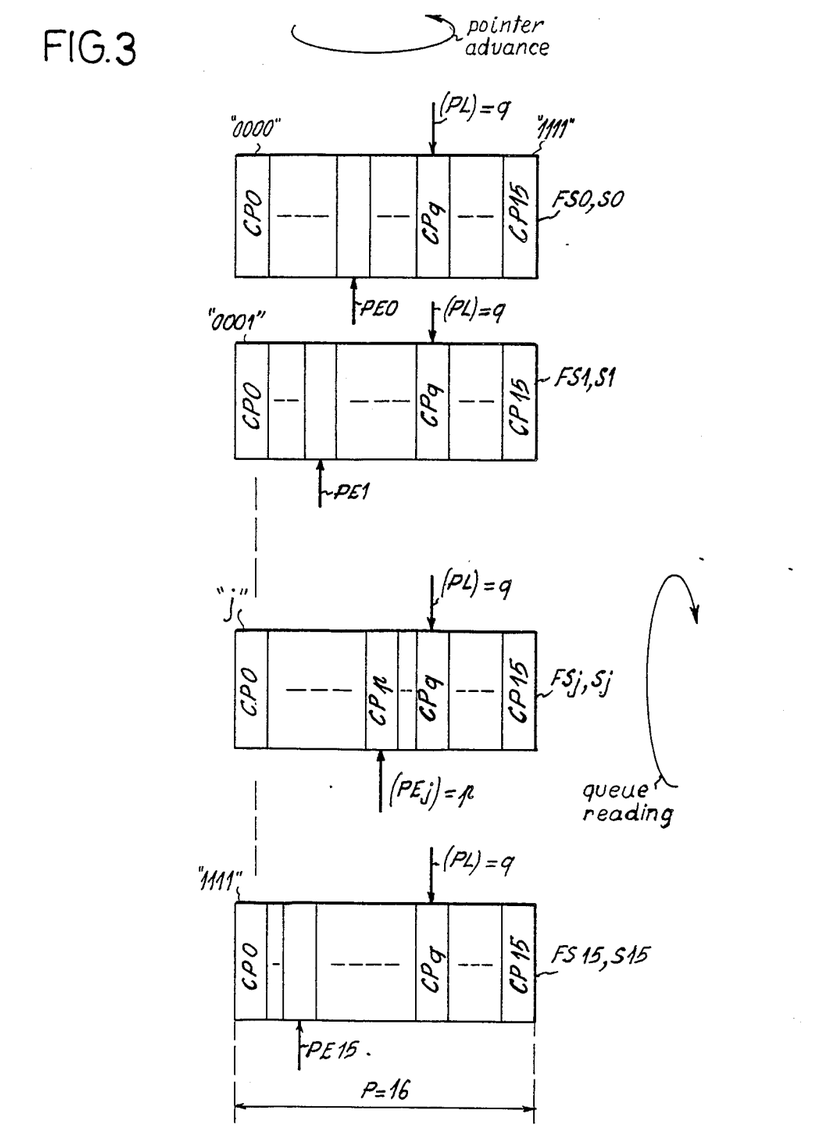
FIG. 3 shows how the packet buffer memory is organized in a plurality of packet buffer queues respectively associated with outgoing time-division multiplexes from the switching system.

In reference to FIG. 3, the buffer memory MT is structured as a set of J=16 buffer queues FS0 to FS15 having as addresses "0000" to "1111" and respectively associated with the J=16 outgoing multiplexes S0 to S15. The buffer queues FS0 to FS15 are each comprised of P=16 packet cells CP0 to CP15 having as addresses "0000" to "1111". To write an incoming packet in the buffer memory MT, the circuit GPE supplies a 8-bit packet write address AE of which four bits of low significance are comprised of the four bits of the self-channelling word AA and address a queue FSj, and of which four bits of high significance are comprised of the four bits of a write pointer PEj of the queue FSj, the pointer PEj being memorized in the circuit GPE, and address an empty cell CPp of the queue FSj. The circuit GPE memorizes and controls J=16 write pointers PE0 to PE15 respectively associated with the queues FS0 to FS15. The reading of the packets in the buffer memory MT is cyclical and is controlled by the time base BT issuing the read addresses AL comprised of the multiplex addresses $\overline{AM}$ and the read pointer PL. The output queues FS0 to FS15 addressed by the multiplex and queue addresses $\overline{AM}$="1111" to $\overline{AM}$="0000" are read cyclically in the order FS15 to FS0 so as to respectively transmit in the outgoing multiplexes FS15 to FS0, at each period of the duration frame J·T, J=16 corresponding outgoing packets. The queue read pointer PL issued by the time base BT is incremented at frequency 1/(J·T), at the end of each read cycle of queues FS15 to FS0 and successively takes the values "0000", ... "q", ... "1111", whereby q is between 0="0000" and 15="1111", to successively address for reading the cells CP0, ... CPq, ... CP15 of the queues FS15 to FS0.

Figure 4:
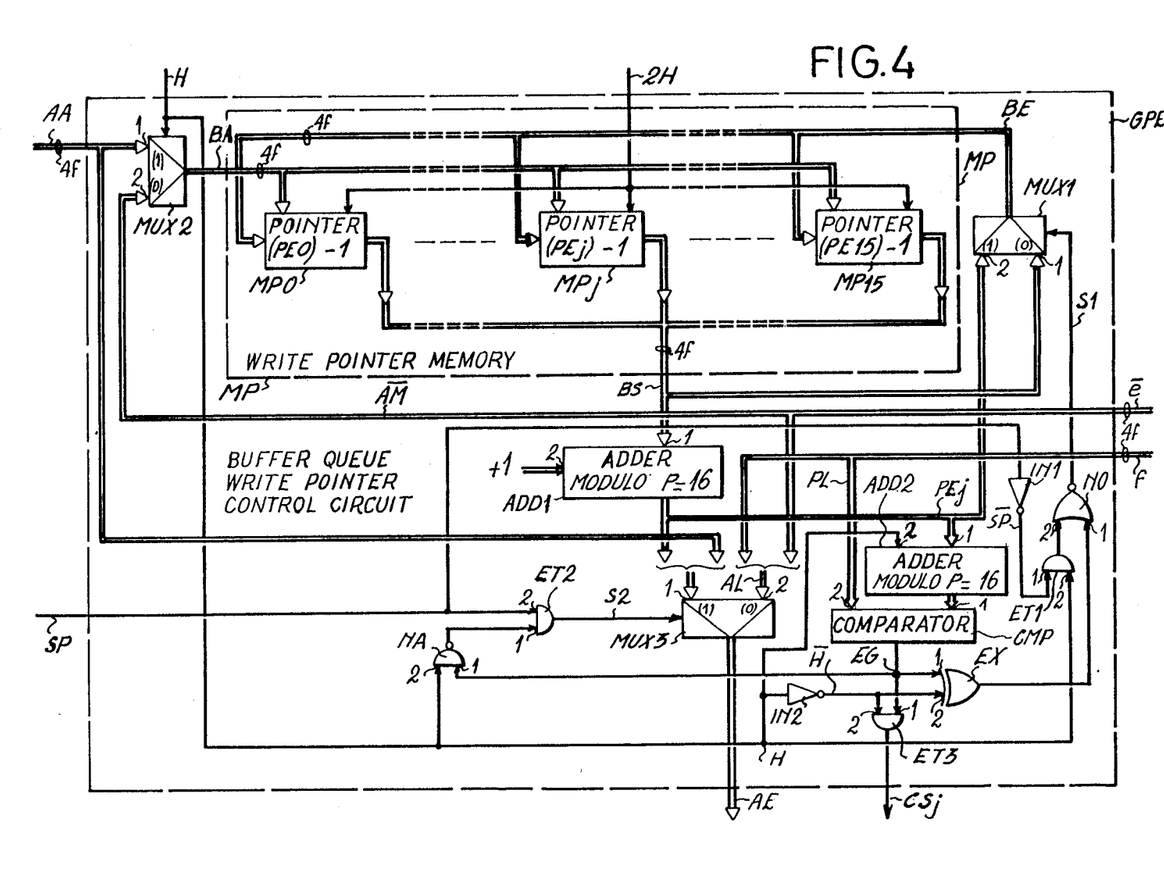
FIG. 4 is a detailed block diagram of a first preferred embodiment of a buffer queue write pointer control circuit embodying the invention included in the switching system.

In reference to FIG. 4, the write pointer control circuit GPE is essentially comprised of a write pointer RAM memory MP, of first and second adders modulo P=16, ADD1 and ADD2, a comparator CMP, and three multiplexers MUX1, MUX2 and MUX3.

The pointer memory MP is comprised of J=16 four-bit elementary memory cells MP0 to MP15 respectively memorizing the values, (PE0)-1 to (PE15)-1, of decremented by 1 with respect to write pointers PE0 to PE15. A four-wire data input bus BE connects the parallel data inputs of each of the cells MP0 to MP15 to parallel outputs of the multiplexer MUX1. A four-wire address bus BA connects parallel address inputs of cells MP0 to MP15 to parallel outputs of the multiplexer MUX2. A four-wire data output bus BS connects parallel data outputs of each of cells MP0 to MP15 to first parallel inputs of the adder ADD1 and to first parallel inputs of the multiplexer MUX1. The clock signal 2H of period T/2 is applied to J=16 write/read selection inputs of the J=16 cells MP0 to MP15 respectively. The logic states "1" and "0" of the signal 2H trigger readings and writings of the value (PEj)-1 memorized in the cell MPj addressed by the multiplexer MUX2, respectively.

The function of the adder ADD1 is to increment by 1 the value (PEj)-1 supplied by the addressed cell MPj so as to obtain the value (PEj) of the write pointer PEj of the queue FSj. Parallel outputs of the adder ADD1 are connected to second parallel inputs of the multiplexer MUX1, to first parallel inputs of the adder ADD2, and to four first parallel inputs of high significance of the multiplexer MUX3. The multiplexer MUX3 receives in parallel, by four other first parallel inputs of low significance, the self-channelling words AA.

The function of the adder ADD2 is to increment by 1 the value (PEj) supplied by the adder ADD1 so as to produce the value (PEj)+1 and this solely during packet writings H=1. To do so, a second input of the adder ADD2 receives the signal H. Parallel outputs of the adder ADD2 are connected to first parallel inputs of the comparator CMP.

The comparator CMP indicates equalities between the values (PEj) of the write pointers PEj and the values (PL) of the read pointer PL during packet readings, H=0, so as to detect "empty queue" states of the queues FS0 to FS15, and between the values (PEj)+1 of the write pointers and the values (PL) of the read pointer during packet writings, H=1, so as to detect "full queue" states of the queues FS0 to FS15. Second parallel inputs of the comparator CMP are connected to the bus f and receive cyclically at frequency 1/(J·T) the different values (PL)="0000" to (PL)="1111" of the read pointer PL. An output of the comparator CMP is connected to first inputs of an OR-Exclusive gate, EX, and of a NAND gate, NA, and issues a logic signal EG in a logic state "1" when the values (PEj) or (PEj)+1 and (PL) respectively applied to the first and second inputs of the comparator CMP are equal, and in a logic state "0" in the opposite case.

The multiplexer MUX1 is controlled by means of the comparator CMP, the OR-Exclusive gate, EX, and AND gate, ET1, an inverter IN1, and a NOR gate, N0. The gate EX receives at a second input the complementary clock signal $\overline{H}$ supplied by the time base BT through the inverter IN2. An output of the gate EX is connected to a first input of the gate ET1. First and second inputs of the gate ET1 respectively receive the complementary signalling bits $\overline{SP}$ and the clock signal H. The inverter IN1 receives the signalling bits SP issued by the first output of the port D0 of the input rotating matrix MRE (FIG. 1) and produces at output the complementary bits $\overline{SP}$. An output of the gate N0 supplies a control signal S1 applied to a selection input of the multiplexer MUX1. The states "0" and "1" of the signal S1 select the writing of the read and non-incremented value (PEj−1) and the writing of the read and incremented value (PEj) in the addressed memory cells MPj respectively.

The multiplexer MUX2 receives at first and second parallel inputs respectively the self-channelling words AA supplied by the port D0 of the matrix MRE, and the multiplex and queue addresses $\overline{AM}$ transmitted by bus e. The clock signal H is applied to a selection input of the multiplexer MUX2 and alternatively controls the switching of the self-channelling words AA and the addresses $\overline{AM}$ towards the address inputs of the cells MP0 to MP15. When the signal H is in the state "1", during the writing of a packet in the buffer memory MT, the self-channelling word AA of the packet is transmitted in the bus BA by the multiplexer MUX2 and addresses the corresponding cell MPj. When the signal H is in the state "0", during the reading of a packet in the buffer memory MT, the address $\overline{AM}$ of queue FSj is transmitted in the bus BA and addresses the corresponding cell MPj. During each packet writing, H="1", the cell MPj addressed by the self-channelling word AA is successively selected for reading, 2H="0", during a first half-period lasting T/4 of the signal 2H, and for writing, 2H="1", during a second half-period lasting T/4 of the signal 2H, so as to read the value (PEj)−1 memorized in the cell MPj to determine the values (PEj) and (PEj)+1 of the pointer PEj and, if necessary, to update the memorized value (PEj)−1, by incrementation, after writing the packet in the queue FSj. Also, during each packet reading, the cell MPj addressed by the address $\overline{AM}$ is successively selected for reading and for writing during the first and second half-periods of the signal 2H.

The incrementation of the memorized value (PEj)−1 in a cell MPj, through writing the value (PEj) in the cell MPj, is controlled when the signal S1 is in the state "1"; this incrementation is expressed by the logic equation:

$$S1 = H \cdot (EG + \overline{SP}) + \overline{H} \cdot \overline{EG} = H \cdot \overline{EG} \cdot SP + \overline{H} \cdot EG$$

The non-incrementation of the value (PEj)−1 is expressed by the complementary logic equation:

$$\overline{S1} = H \cdot (EG + \overline{SP}) + \overline{H} \cdot \overline{EG}.$$

The value (PEj)−1 memorized in the addressed cell MPj is not incremented during a packet writing, H="1", in a first case where the signal EG="1", i.e. (PEj)+1=(PL), indicates that the addressed queue FSj is full, and in a second case $\overline{SP}$="1", i.e. where the packet is an empty packet PV and is therefore not to be written in the buffer memory. In these first and second cases, the incoming packets are nonetheless written in the queue FSj, though in cells where the packets will be "overlaid" at a later stage and consequently lost. Furthermore, during a reading, $\overline{H}$="1", in the event of EG="1", i.e. (PL)=(PEj), the addressed queue FSj is empty and the value (PEj)−1 memorized in the addressed cell (MPj) is incremented. The read pointer PL then "pushes" before it the write pointer PEj. The necessity of this possible incrementation of the value (PEj)−1 during readings will appear more clearly further on.

The multiplexer MUX3 is intended to switch a write address AE towards the write address inputs of the buffer memory MT. The address AE is comprised of the self-channelling word AA and the corresponding pointer PEj, when the packet to be written is a valid information packet PQ and the corresponding queue FSj is not full. The write address AE is equal to the address AL of the last packet cell read in the memory MT when the packet to be written is a synchronization packet PV or when the corresponding queue FSj is full. In this last case, the value (PEj)−1 memorized in the cell MPj is not incremented, S1="0", and the packet PV or PQ written in the last packet cell read in the memory MT is "overlaid" and lost as a result of a subsequent writing of a packet in the same outgoing queue FSj. The multiplexer MUX3 receives the write address AL carried by the buses e and f to second parallel inputs. A control signal S2 supplied by a AND gate, ET2, is applied to a selection input of the multiplexer MUX3. The signal S2 selects, in the state "1", the first inputs of the multiplexer MUX3, and in the state "0", the second inputs of the multiplexer MUX3. The signal S2 is produced from the signals EG and H and from the signalling bits SP by means of the gates NA and ET2. The signal H is applied to a second input of the gate NA receiving at its first input the signal EG supplied by the comparator CMP. An output of the gate NA is connected to a first input of the gate ET2. A second input of the gate ET2 receives the signalling bits S. The signal S2 is expressed by the logic equation:

$$S2 = \overline{EG} \cdot SP + \overline{H} \cdot SP.$$

A two-input logic AND gate ET3 is provided in the circuit GPE so as to detect the "empty queue" state of the queue FSj addressed for reading. The gate ET3 receives the signals EG and $\overline{H}$ respectively at first and second inputs and produces a synchronization packet inserting control bit CSj in the state "1" when an "empty queue" state of the addressed queue FSj is detected. The bit CSj in the state "1" controls in the synchronization packet inserting circuit IPS, shown in FIG. 2, the insertion of a synchronization packet PV into the outgoing multiplex Sj corresponding to the addressed queue FSj. The circuit IPS comprises a shift register RGV receiving the signal H through a clock input and the bits CS15, ... CSj, ... CS0 issued cyclically in serial form by the gate ET3, and fifteen octet switches CTR1 to CTR15 respectively controlled by fifteen outputs of the register RGV. When the addressed file FSj is empty, a time interval is available in the outgoing multiplex Sj and the bit CSj="1" controls in the circuit IPS the diagonal transmission of a synchronization packet PV towards the output rotating matrix MRS.

Figure 5:
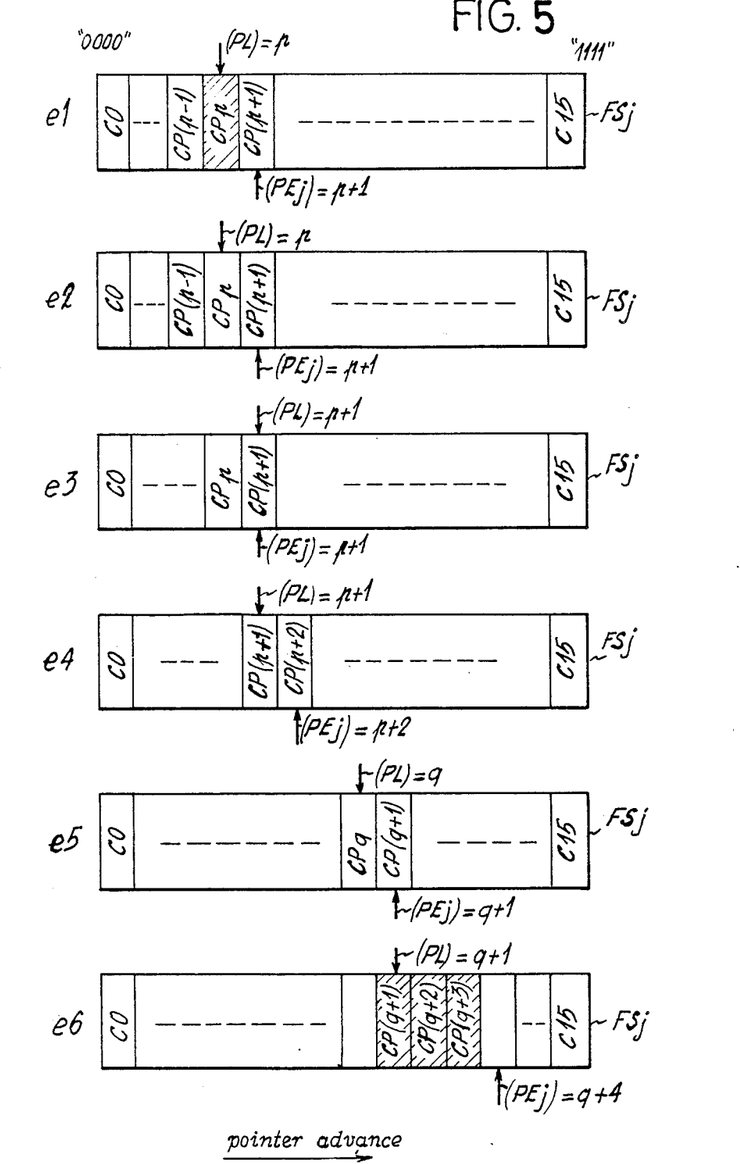
FIG. 5 shows successive states of a buffer queue in the region of the "empty queue" state.

Six successive states of the queue FSj, e1 to e6, in the region of the "empty queue" state are shown in FIG. 5.

From state e1 to state e5, no incoming packet intended to be memorized in the queue FSj is transmitted by the matrix MRE. In the state e1, all the cells of the queue FSj are empty with the exception of a cell CPp which contains an unread packet. The read pointer PL has value p. The write pointer PEj has value p+1. After the reading of the packet contained in the cell CPp, the queue FSj moves on to the state e2 where the pointers PL and PEj still have respectively values p and p+1. On incrementation of the value of the read pointer PL, the queue FSj is in the state e3 whereby the read pointer PL and write pointer PEj have the same value p+1. On reading the cell CP(p+1), the pointers PL and PEj having the same value p+1, the gate ET3 (FIG. 5) controls the transmission of a synchronization packet PV towards the output matrix MRS. At the end of reading of the cell CP(p+1), the value of the write pointer PEj is incremented and becomes p+2; the queue FSj moves on to the state e4. Between the states e4 and e5, the value of the read pointer PL is incremented several times until it reaches the value q and the cells CP(p+1) to CPq are read. The value of the pointer PEj is incremented consecutively to each reading of the cells CP(p+1) to CPq, and attains the value q+1. The write pointer PEj is thus "pushed" by the read pointer PL and indicates the first free cell in the queue FSj. During the reading of the cells CP(p+1) to CPq, the values (PL) and (PEj) are equal and a synchronization packet PV is transmitted to the matrix MRS at each cell reading. Between the states e5 and e6, three packets are transmitted by the input matrix MRE towards the queue FSj. These packets are respectively written in the cells CP(q+1) to CP(q+3) and the write pointer PEj reaches the value q+4 after writing of the last packet.

The cells CP(q+1), CP(q+2) and CP(q+3) are then read when the read pointer PL takes the values q+1, q+2, and q+3, respectively.

Figure 6:
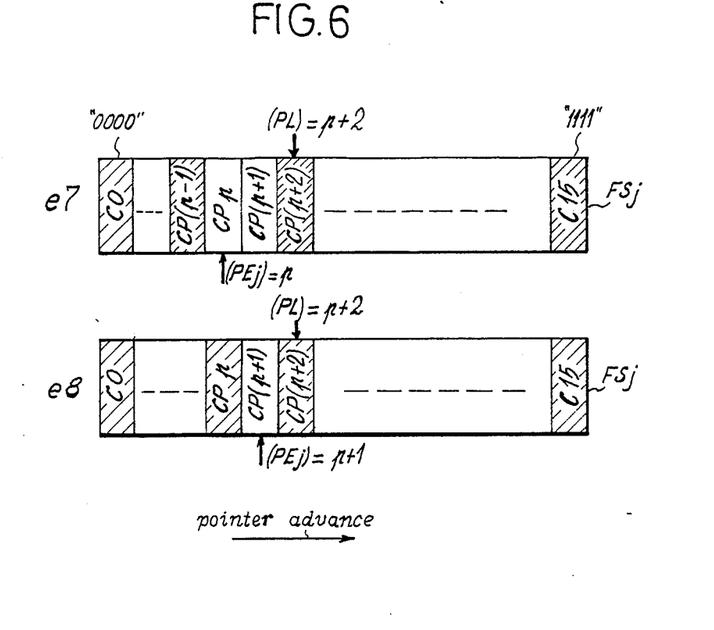
FIG. 6 shows successive states of a buffer queue in the region of the "full queue" state.

Two successive states of the queue FSj, e7 and e8, in the regions of the "full queue" state are shown in FIG. 6.

Here, the rate of the incoming packets intended to be memorized in the queue FSj is considered to be much higher than the output rate of the packets read in the queue FSj, in such a way that the queue FSj will be saturated. In the state e7, all the cells of the queue FSj are full with the exception of the cells CPp and CP(p+1). The write pointer PEj has value p. The read pointer PL has value p+2. An incoming packet is loaded in the cell CPp and the write pointer PEj takes the value p+1; the queue FSj is then in the state e8. In the state e8, the pointers PEj and PL have respectively values p+1 and p+2 and are thus such as (PL)=(PEj)+1. The signal EG is then in the state "1" for all the subsequent incoming packets presented by the matrix MRE to be written in the queue FSj; these packets are not written in the queue FSj in the state "full queue". The pointer PEj is not incremented and maintains value p+1. In this "full queue" state the cell CP(p+1) does not contain any packet.

Each of the pointer memory MP cells MP0 to MP15 is accessed twice for reading and twice for writing during a period T of the signal H. In the case of period T being of too short duration to enable the use of memories, the pointer memory can be replaced by a counter circuit enabling operating at higher speeds.

Figure 7:
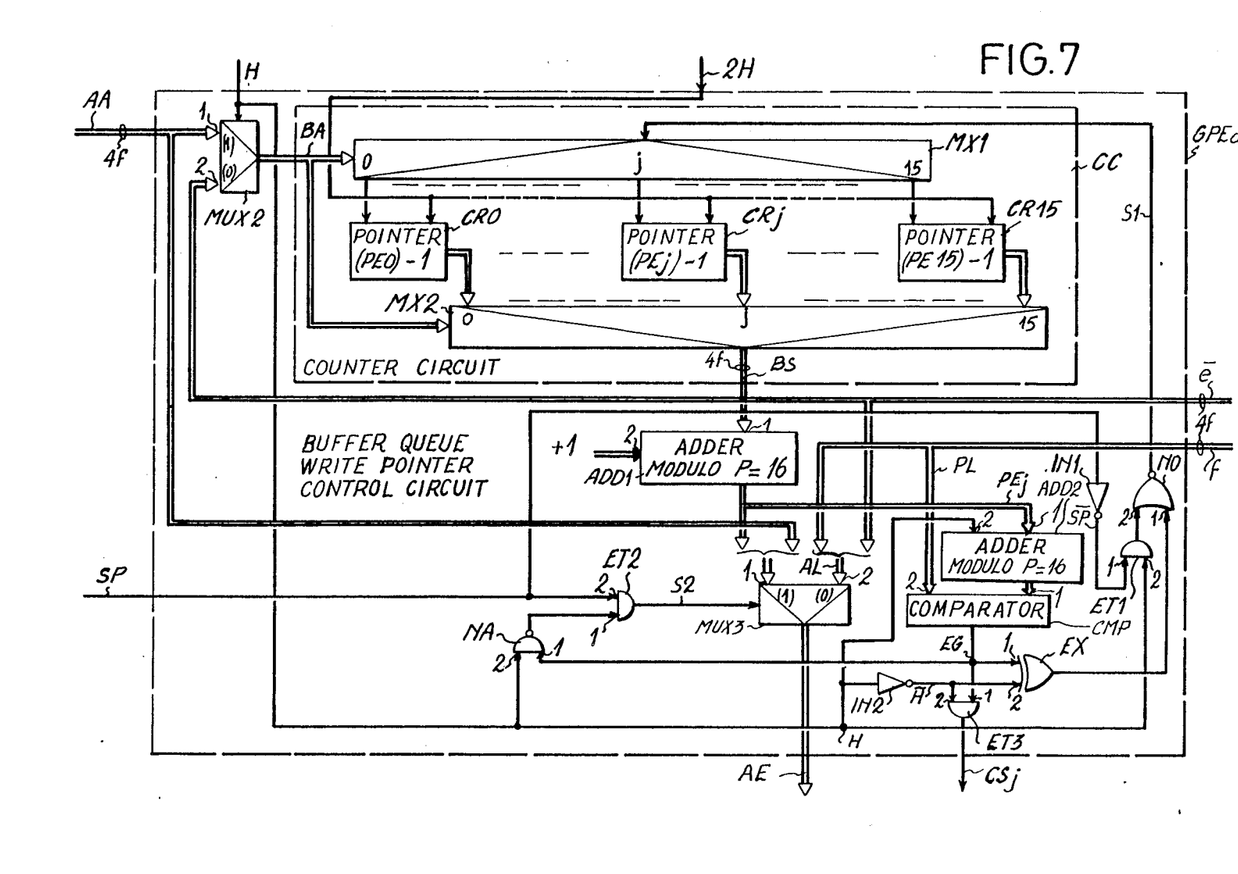
FIG. 7 is a detailed block diagram of a second preferred embodiment of the buffer queue write pointer control circuit embodying the invention.

A buffer queue write pointer control circuit GPEa in which the pointer memory MP is replaced by a counter circuit CC is shown in FIG. 7. The circuit GPEa functions analogously to the circuit GPE described previously and, taken as a whole, comprises the same functional elements.

The counter circuit CC comprises J=16 binary counters CR0 to CR15 that are J=16 modulo counters, and first and second multiplexers, MX1 and MX2.

The function of the counters CR0 to CR15 like that of the cells MP0 to MP15 (FIG. 4) is to respectively memorize the values (PE0)−1 to (PE15)−1. Clock validation inputs of the counters CR0 to CR15 receive the clock signal 2H which only authorizes the possible incrementation of a selected counter CRj on a write control state 2H="1" of the clock signal 2H. In the circuit GPEa, the multiplexer MUX1 (FIG. 4) is discarded and the control signal S1 supplied by the NOR gate, N0, is applied to a clock input of a counter CRj selected by the multiplexer MX1. The multiplexer MX1 comprises a data input connected to the output of the gate N0 to receive the signal S1 and P=16 outputs 0 to 15 respectively connected to the clock inputs of the P=16 counters CR0 to CR15. The address bus BA connects the parallel outputs of the multiplexer MUX2 to parallel selection inputs of the multiplexers MX1 and MX2. The output j of the multiplexer MX1 selected by the word AA or the address $\overline{AM}$ supplied by the multiplexer MUX2 applies the signal S1 to the clock input of the counter CRj. The counter CRj is only incremented in the case of S1="1". The multiplexer MX2 comprises P=16 four-input ports 1 to 15 respectively connected to parallel outputs of the P=16 counters CR0 to CR15. A four-output port of the multiplexer MX2 is connected to the bus BS and issues the value (PEj)−1 supplied by the selected counter CRj.

What we claim is:

1. A circuit for controlling write pointers of J buffer cell queues temporarily memorizing incoming data groups in chronological order of arrival, where J is a predetermined integer, each of said incoming data groups including a respective channelling word for enabling selection of a respective one of plural buffer queues in one of the cells of which said incoming data group is to be written, a time base providing a cycle of J queue read addresses and a queue cell read pointer to said circuit, said time base incrementing said read pointer by unity during every queue read cycle so as to successively read cells in each of said queues, said circuit comprising means for memorizing decremented values of J write pointers respectively associated with said J buffer queues, a write pointer identifying a cell which is free in the respective queue whereby a further incoming data group including the respective channelling word is written in said free cell of said respective queue, means for reading the memorized decremented value of the write pointer associated with a queue which is selected as a function of said channelling word during writing of an incoming data group in said selected queue and which is selected as a function of said queue read address during reading of an outgoing data group from said selected queue, first means for incrementing by unity the read decremented value of the said write pointer of said selected queue during said outgoing data group reading, thereby deriving a value of said write pointer of said selected queue, second means for incrementing by two units the read decremented value of the write pointer of said selected queue during said incoming data group writing, thereby deriving a value incremented by unity of said write pointer of said selected queue, means for comparing write and read pointers to thereby detect (a) an equality between said value of said write pointer associated with said selected queue and said read pointer value, and (b) an inequality between said incremented-by-one-unit write pointer value and said read point value; and means for writing said write pointer value of said selected queue in said memorizing means responsive to one of said equality and inequality detected by said comparing means, said equality being consecutive to said outgoing data group reading from said selected queue, and said inequality being consecutive to said incoming data group writing to said selected queue.

2. The circuit of claim 1, further comprising means having first inputs for receiving said channelling word and said write pointer of said selected queue and second inputs for receiving said queue read address and said read pointer for deriving a queue cell write address by selection of said first and second inputs, said write address including said channelling word and said write pointer in response to an incoming data group validation signal and absence of said equality, and said write address including said queue read address and said read pointer in the complementary case.

3. The circuit of claim 2, wherein said queue cell write address deriving means comprises logic means for selecting said first and second inputs as a function of said validation signal, a clock signal supplied by said time base for sequencing said data group writing and reading with respect of said queues, and said pointer comparing means deriving a signal for signalling said equality and inequality.

4. The circuit of claim 1, wherein said decremented write pointer value reading means comprises a multiplexer having first inputs for receiving said channelling word, second inputs for receiving said queue address, and an input for selecting input for receiving a clock signal supplied by said time base and for sequencing said data group writing and reading with respect of said queues, said clock signal having first and second logic states whereby said channelling word and said queue address are respectively applied to address inputs of said memorizing means.

5. The circuit of claim 1, wherein each of said first and second incrementing means comprises a modulo-P adder, whereby P is an integer representing the number of cells in a queue.

6. The circuit of claim 1, wherein said writing means receives a clock signal supplied by said time base for sequencing said data group writing and for reading with respect of said queues, (a) an incoming data group validation signal, and (b) a logic signal derived by said comparing means, and for controlling writing of said read decremented value of said selected queue write pointer into said memorizing means when said equality is detected by said comparing means and when said incoming data group is signalled as valid by said validation signal.

7. The circuit of claim 1, wherein said memorizing means comprise J memory cells for respectively memorizing said decremented values of said J write pointers, said memory cells being addressed individually by said reading means in response to said channelling word while said incoming data group is being written into said memory cells in response to a queue address while said outgoing data group is being read from said memory cells.

8. The circuit of claim 1, wherein said memorizing means comprises J binary counters selectively controlled by said writing means, said memorizing means respectively memorizing said decremented values of said J write pointers and being addressed individually by said reading means in response to said channelling word while said incoming data group is being written into said memorizing means and in response to said queue read address while said outgoing data group is being read from said memorizing means, an addressed counter incremented in response to one of said write and read pointer inequality and equality respectively being detected while a valid incoming data group is written into the memorizing means while an outgoing data group is read from the memorizing means.

9. The circuit of claim 1, comprising means for signalling an equality between said values of said write pointer of said selected queue and said read pointer while said outgoing data group is being read from the memorizing means.

10. A self-channelling packet time-division switching system in which packets received via J incoming time-division multiplexed channels are to be switched towards J outgoing time-division multiplexed channels, where J is a predetermined integer, each of said packets including a channelling word identifying one of said outgoing multiplexed channels to which said packet is to be switched, said system comprising:

J input means respectively associated with said incoming multiplexed channels for detecting said packets in said incoming multiplexed channels and for transmitting synchronized incoming packets, means connected to said input means for multiplexing said synchronized incoming packets into incoming multiplexed packets, J buffer cell queues connected to said multiplexing means and respectively associated with said J outgoing multiplexed channels for temporarily memorizing said incoming multiplexed packets, each of said buffer queues being addressable by a respective one of said channelling words and for writing each incoming multiplexed packet including said respective channelling word into a cell of said buffer queue, a time base providing a cycle of J queue read addresses and a queue cell read pointer, said time base incrementing said read pointer by one unit for every queue read cycle so as to successively read cells in each of said queue, means for memorizing decremented values of J write pointers respectively associated with said J buffer queues, a write pointer identifying a cell which is free in the respective queue whereby a further incoming multiplexed packet including the respective channelling word is written in said free cell of said respective queue, means for reading the memorized decremented value of the write pointer associated with a queue which is selected as a function of said channelling word during writing of an incoming multiplexed packet in said selected queue and which is selected as a function of said queue read address during reading of a multiplexed packet outgoing from said selected queue, first means for incrementing by one unit the read decremented value of said write pointer of said selected queue during said outgoing packet reading for deriving a value of said write pointer of said selected queue, second means for incrementing by two units the read decremented value of said write pointer of said selected queue while said incoming packet is written into said means for memorizing and for deriving a value incremented by one unit of said write pointer of said selected queue, means for comparing write and read pointers and for detecting an equality between said value of said write pointer associated with said selected queue and said read pointer value, and an inequality between said incremented-by-one-unit write pointer value and said read pointer value;

means for writing said write pointer value of said selected queue in said memorizing means in response to one of said equality and inequality being detected by said comparing means, said equality being consecutive to said outgoing packet being from said selected queue, and said inequality being consecutive to said incoming packet being written into said selected queue, and means for demultiplexing the outgoing packets read cyclically in said buffer cell queues under the control of said time base and for transmitting demultiplexed packets in said outgoing multiplexed channels.

* * * * *